April 25, 1967   C. J. GRIMLAND   3,315,531
ACCELEROMETER
Filed May 28, 1964

INVENTOR
CHARLES J. GRIMLAND
BY Alexander & Dowell
ATTORNEYS

United States Patent Office 3,315,531
Patented Apr. 25, 1967

3,315,531
ACCELEROMETER
Charles J. Grimland, Garland, Tex., assignor to The Geotechnical Corporation, a corporation of Delaware
Filed May 28, 1964, Ser. No. 371,005
14 Claims. (Cl. 73—515)

This invention relates to improvements in sensitive inertial instruments, and more particularly to improved accelerometers in which the inertia sensing element floats on compressed-fluid bearing means which also supply fluid pressure restoring forces urging the inertia sensing element to its neutral or centered position which it normally occupies in the absence of any accelerating or decelerating forces.

It is a principal object of this invention to provide an improved accelerometer structure having a high degree of sensitivity, while at the same time providing a practical structure which is both simple and rugged.

It is another object of this invention to provide an accelerometer which is entirely fluid-pressure operated and which includes not only air bearings and pneumatically operated restoring forces, but which also includes novel pneumatic valve means providing no output when the inertia sensing element is centered, and providing outputs at separate ducts depending on the direction of displacement of the inertia sensing element as determined by sensing an acceleration in one direction or an acceleration in the opposite direction, either one of which may represent deceleration in a practical application.

In the past, many accelerometers have incorporated springs used to return the inertia sensing element to a centered or zero position in the absence of acceleration forces. The spring-operated accelerometers have not proven entirely satisfactory because they are subject to drift of the neutral position, due to thermal effects, and to frictional drags which greatly reduce their sensitivity.

The present improved accelerometer structure is illustrated by an example which comprises a housing having a spool located within a bore in the housing and axially shiftable therein. The housing has a number of ducts through its side walls to permit the introduction of air under pressure, or alternatively the venting of internal pressures, which may also include useful outputs. The spool does not touch the housing during operation, but floats within the housing on film-like cushions of air strategically placed near the ends of the spool so as to take advantage of the Bernoulli effect to provide an air bearing by permitting fluid under pressure to escape through the snug clearances between the housing and the bearing areas of the spool.

The air escaping from the bearings near the ends of the spool enters a zone adjacent the end walls of the housing and is permitted to escape therefrom through several small ducts which tend to meter the rate of escape of the air. When the spool is centered in the housing the small ducts near each end thereof are opened to the same degree so as to permit the same amount of air to escape from each end zone, whereby the pressure in the two end zones will be equal and the spool will be held in centered position. However, when a force axially displaces the spool closer to one end of the housing than to the other, the spool will partly close and thus throttle the escape ducts at the end nearest the smaller zone and at the same time will further open the duct at the end nearest the larger zone. As a result, the pressure in the smaller zone rises and the pressure in the larger zone decreases, and this differential in pressure operates to provide a servo action which restores the spool toward centered position.

It is this combined pneumatic suspension and restoration which provides the accelerometer with very great sensitivity. The particular accelerometer illustrated in the present drawings has been successfully used for measuring acceleration forces smaller than $10^{-5}$ G's, which represents about three-millionths of a pound of pressure tending to displace the spool from its centered position.

It is another object of the present invention to make the sensitivity of the accelerometer adjustable by adding a pneumatic tube to the accelerometer which joins both end zones thereof and which has some sort of restriction within the tube so that resistance to air flow therethrough can be controlled, and perhaps even manually adjusted from time to time in a more flexible form of the invention. If a tube were used having a very large bore which freely joins together the two end zones, the flow of gas between zones through this tube would make it possible to establish only a very small differential in pressure in the two zones. In this case the restoring forces on the accelerometer spool would be decreased and its action would become more sluggish. On the other hand, if there were a valve in the tube, and if this valve were nearly closed down so as to restrict the flow of air through the tube between the two zones, then relatively greater pressure differentials and thus greater restoring forces could be generated in the two end zones. Thus such a valve would provide a way to manually adjust the magnitude of the restoring force in the end zones.

Another modification of the present invention provides a way of making the restoring action greater by placing the end zone ducts in the end walls of the housing and then placing conical projections on the ends of the spool so that when the spool is displaced toward an end wall, the projection will move into the duct and throttle it in proportion to displacement off-center, thereby making the end zone restoring pressure increase rapidly with displacement.

The present invention also teaches the providing of skewed slots in the pneumatic bearing surfaces so as to provide a turbine effect causing the spool of rotate within the housing. Such rotation can be an advantage in grinding up any minute impurity particles which find their way into the housing not withstanding the fine-mesh filter which is always used in the air pressure lines supplying pneumatic circuitry of the present type.

In the center of the accelerometer between the two bearing areas there is a slide valve arrangement in which five ducts are drilled through the housing. Fluid under pressure is introduced through the center duct and is normally confined therein by annular shoulders on the spool which normally occupy such a position that they substantially prevent the escape of air from the center duct toward either side of the axial structure. These fins overlie and normally close two output ducts which are symmetrically located about the center duct, and thereby prevent air from escaping in significant quantity through either output duct. However, when the spool is displaced from center in either direction, one of the output ducts is exposed, thereby permitting air to escape through that output duct to provide an output indicating the direction of displacement of the spool. There are two other vent ducts located adjacent each of the output ducts and further off-center therefrom. When the spool is moved off center by an acceleration force, the input duct is connected to one output duct and the other output duct is vented to the atmosphere by the vent duct located adjacent thereto and to which it is exposed by movement of another shoulder on the spool in such a direction as to connect the output duct and the vent duct together. Thus, when the spool is centered neither output duct receives any pressure from the input duct, but when the spool is moved off-center one of the output ducts is connected to the input duct and the opposite output duct is vented to the atmosphere, and vice versa when the spool is moved in the other direction off-center.

Other objects and advantages of the present invention will become apparent during the following discussion of the drawings, wherein.

Figure 1:
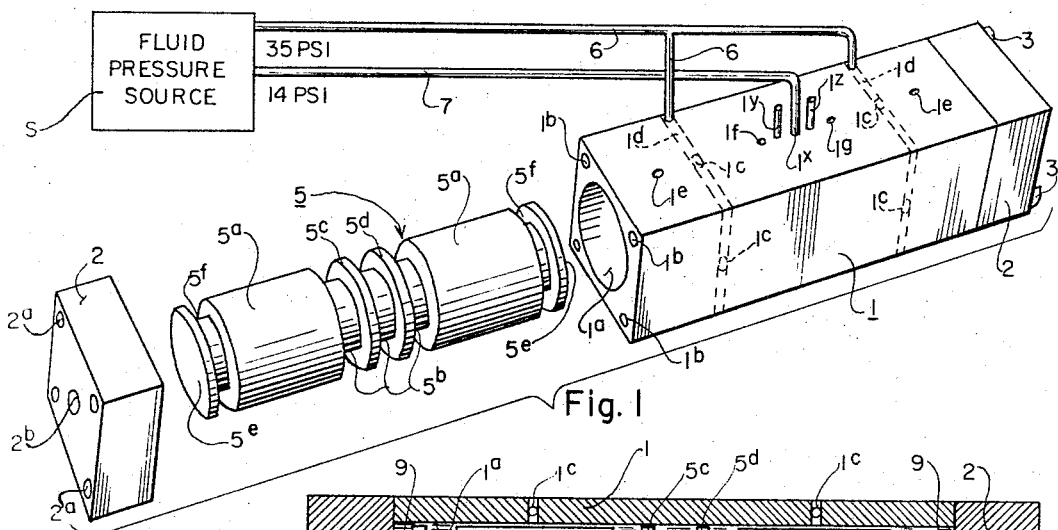
FIG. 1 is an exploded perspective view showing an accelerometer according to the present invention connected with a source of fluid pressure.
Figure 2:
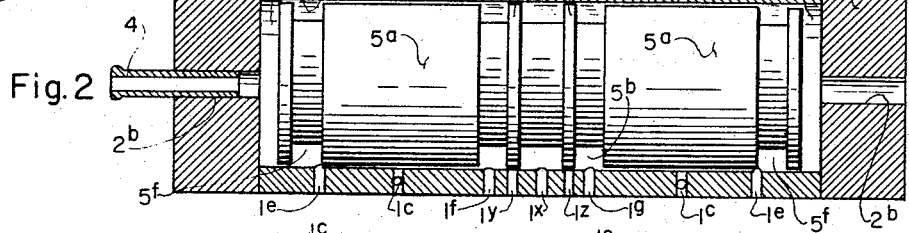
FIG. 2 is an enlarged cross-section view taken through the axis of the accelerometer shown in FIG. 1.
Figure 4:
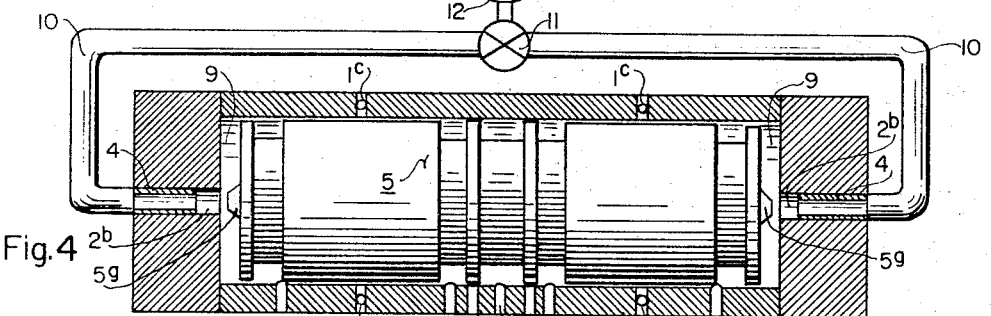
Figure 5:
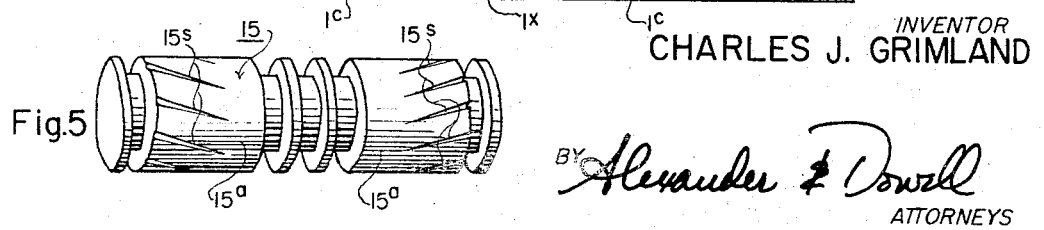

FIG. 4 is a cross-sectional view similar to FIG. 2 showing a modified structure in which conical extensions have been added to the ends of the spool for throttling the duct on the end of the accelerometer when the spool is displaced theretoward; and FIG. 5 is a perspective view of an accelerometer spool similar to that shown in FIG. 1, but showing turbine slots extending into the bearing surface to provide a rotational component of motion to the spool within the housing.

Figure 3:
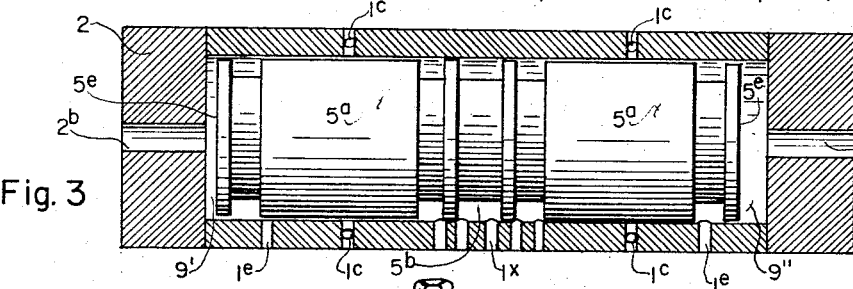
FIG. 3 is a cross-sectional view similar to FIG. 2, but showing the spool displaced from center toward the left.

Referring now to the drawings, FIGS. 1, 2, and 3 provide an illustration of an accelerometer according to the present invention including a housing 1 having a bore 1a extending therethrough and having tapped screw holes 1b in each end to facilitate securing the end plates 2 to the housing using bolts 3 in order to fully close the bore 1a. Each of the end plates 2 has holes 2a for receiving the bolts 3, and in addition has a central duct 2b through the end wall which can receive a piece of small-diameter tubing 4 as shown in FIG. 2 so that a piece of rubber or plastic tubing can be conveniently attached to the duct 2b. An inertia-sensitive mass in the form of a spool 5 is located within the bore 1a and is a snug sliding fit therein with an annular clearance space amounting to a few thousandths of an inch, at most. The parts of the accelerometer illustrated in FIG. 1 are approximately full size when compared with working models of the invention currently being manufactured for use as motion detectors on automated machine tools. The housing 1 and the end plates 2 can conveniently be made of brass, while the spool should be made of different material, for instance steel. The spool 5 has two spaced bearing areas 5a separated from each other by three grooves 5b and two annular ribs 5c and 5d serving as valving shoulders. Between the bearing areas 5a and the transverse end faces of the spool 5e are located annular grooves 5f, the purpose of the grooves and ribs being more fully discussed hereinafter.

The housing 1 has a plurality of ducts through its side walls, these ducts including eight air-bearing ducts 1c disposed in quadrature relationship about the housing opposite the bearing surfaces 5a, and each series of four ducts 1c near each end of the housing being mutually interconnected by passages 1d which are respectively connected with air tubing 6 coupled with a source of air pressure S. On a practical basis, it has proven valuable to use air at several different pressures, for instance the tubing 6 bringing air in at 35 p.s.i. for the air bearings. The pressure source S also delivers air through another tube 7 at 14 p.s.i. which is applied to another inlet duct, to be discussed hereinafter.

The housing further includes exhaust ducts 1e which connect the bore 1a with the atmosphere at accurately selected locations such that when the spool is centered in the housing, the ends of the bearing surfaces 5a of the spool will half-overlap the exhaust ducts 1e as shown in FIGS. 2 and 4.

The housing 1 has five more ducts through it as can be seen on the upper central surface of the housing in FIG. 1. These five ducts when taken with the three grooves 5b and two ribs 5c and 5d in the center of the spool form an indicator valve assembly which delivers to output ducts 1y and 1z no air pressure when the spool is centered, but which delivers an output through one of these output ducts each time the spool is displaced off-center, and these two possible outputs serve to indicate acceleration in one or the other axial direction.

These five ducts include a central pressure-inlet duct 1x, this duct being connected with tubing 7 coming from the fluid pressure source S and delivering pressure at a reduced level of about 14 p.s.i. The two ducts located adjacent to the duct 1x and on each side thereof comprise the output ducts 1y and 1z respectively, and in addition, there are two atmospheric vent ducts 1f and 1g located still further off-center.

When the spool is precisely centered as shown in FIG. 2, the ribs 5c and 5d cover and close the two output ducts 1y and 1z, and the air furnished through the duct 1x into the center groove 5b is trapped therein, except for an insignificant amount of leakage air passing outwardly between the ribs 5c and 5d and the bore 1a. On the other hand, when the spool is moved off-center, for instance leftwardly as shown in FIG. 3 the ribs 5c and 5d also move leftwardly thereby exposing the output duct 1y to the air pressure from the inlet duct 1x through the center groove 5b. Moreover, the rib 5d has now moved to a position between the ducts 1x and 1z, thereby blocking the flow of air from the duct 1x to the duct 1z, and also connecting the duct 1x to the vent duct 1g through the rightmost of the three grooves 5b.

Conversely, if the spool should move to the right of center of the housing 1, then the left output duct 1y would be vented through the duct 1f and the output duct 1z would be inclined within the center groove and thereby connected to receive 14 p.s.i. from the tubing 7 through the duct 1x. With this structure, neither output duct 1y or 1z provides an output when the spool 5 is centered, but when the spool is moved off-center, the output duct in the direction of displacement is pressurized, and the other output duct is vented. By appropriate placement and spacing of the ribs and the five valve ducts, the amount of displacement of the spool required to deliver an output can be selected so as to provide virtually no increment of dead motion, or to require a certain amount of displacement of the spool in order to provide an output. In the working model to be described hereinafter, the spool had to be moved about 7 thousandths of an inch in order to provide an output of significant magnitude.

In operation, the 35 p.s.i. of fluid pressure introduced through the ducts 1c escapes through the clearance space between the bearing areas 5a at each end of the spool and the walls of the bore 1a. Part of this air pressure escapes toward the center of the accelerometer and out through the vents 1f and 1g, and the remainder of the bearing air escapes outwardly with respect to the center of the accelerometer and passes into the grooves 5f near the ends of the spool. Each groove 5f communicates with about half of the diameter of an escape duct 1e when the spool is centered so that it covers about half of the duct area. Moreover, part of the air pressure built up within the grooves 5f escapes into the end zones 9, and out through the end ducts 2b.

The proportion of air escaping through the end ducts 2b as compared with that escaping through the escape ducts 1e depends on their relative diameters but also upon the clearance of the endmost ribs on the spool, which may be different from the annular clearance in the bearing areas 5a of the spool. When the spool is centered as shown in FIG. 2, the escape of air through the end ducts 2b is about equal at each end of the bore 1a and therefore the pressure in the two end zones 9 is about equal, and there is no tendency for the spool to move in either direction in the bore 1a except under the influence of inertia forces. However, when the spool is displaced off-center in one direction as shown in FIG. 3 the air escaping between the bearing surfaces 5a at the left end of the spool has a more difficult time leaving the end zone 9' than the air escaping toward the end zone 9", and therefore the pressure in the end zone 9' is greater than that in the end zone 9" and a differential restoring force exists tending to center the spool in the bore 1a. Because the spool is moved off-center to the left as shown in FIG. 3, the left exhaust duct 1e is virtually closed off by the spool, but the right duct 1e is fully uncovered and therefore can permit air to escape at a relatively high rate. Moreover, as the end face 5e of the spool approaches the left end plate 2, it throttles the left duct 2b and thus contributes to a further rise in pressure in that end zone. In an opposite manner, the end duct 5b at the right end of FIG. 3 remains open because of the movement of the right end 5e of the spool away from the duct 2b, and therefore it is easy for the air to escape from the zone 9″, thereby lowering the pressure in the zone 9″. Thus, the further off-center the spool moves in one direction, the greater the pressure in the end zone on that side will become, and therefore the greater will be the pressure in that end zone tending to recenter the spool. It is also possible to provide each escape duct 1e with an elongated and tapered shape so that the closing of the duct 1e is made more gradual when the spool is displaced in a direction to cover it, or to provide a distribution of several escape ducts 1e at each end of the housing.

In a recently tested accelerometer, the ducts 1x, 1y and 1z were 1/8 inch in diameter which dimension was the same as the axial width of the ribs 5c and 5d. This accelerometer was tilted off-horizontal until the lower output duct 1y had an output of eight ounces of pressure. The accelerometer was then further tilted and measurements showed that over a four-second arc increase in tilt there was about a half inch change in height of a water column used to measure the output pressure from this output duct 1y on the low side of the accelerometer. When the accelerometer was inclined an additional 10-millionths of an inch, a pressure of .000008 p.s.i. in the end zone on the low side was required to recenter the spool in the housing. Calculations therefore show that accelerations smaller than $10^{-5}$ G's can be detected.

FIG. 4 shows a structure identical to that in FIG. 2, with two exceptions. In the first place, each end surface of the spool is provided with a conical throttling tip member 5g located directly opposite the duct 2b in the end plate 2 so that when the spool is displaced toward an end plate, the conical tip member 5g quickly throttles the duct 2b and thereby raises the pressure within the end zone 9 more rapidly than would be the case in the absence of a conical tip member 5g on the end of the spool 5. Thus, an additional means is provided for the restoring force upon the spool whenever it is displaced substantially off-center.

The other modification shown in FIG. 4 includes by-pass tubing 10 connected with tubes 4 in the end ducts 2b, and the tubing 10 including an adjustable restricting valve 11 capable of providing an adjustable resistance to flow of fluid through the tubing 10 by rotation of the hand wheel 12 to control the choking action of the valve 11. When the valve 11 is completely open, assuming that the bore within the tubing 10 is of substantial diameter, the two end zones 9 are joined together so that their pressures cannot be very different from each other, and therefore the restoring forces which can exist due to differential pressures in the end zones 9 will necessarily be small. Conversely, if the valve 11 is completely closed, a substantial amount of differential pressure can exist in the two end zones 9, and therefore greater restoring forces can exist in the form of differential pressures within these end zones. In between these two extremes a considerable range of restoring forces can be obtained by suitably positioning the restricting valve 11.

FIG. 5 shows a modified form of spool 15 which is identical to the spool 5 shown in FIG. 1 except that the spool 15 includes series of turbine effect slots 15s in its bearing areas 15a, the slots being skewed so that as the air escapes in an outward direction away from center in these slots, a component of rotation will be applied to the spool so as to keep it revolving within the bore 1a. This spinning of the spool within the bore is an advantage not only for the purpose of discouraging binding of the spool within the housing, but also for the purpose of grinding up and destroying any small granular particles which might enter the system. Furthermore, in the event that the spool should be subjected to a series of shocks which might drive it against the housing, the rotation of the spool would tend to distribute bruised spots to different locations on the moving parts to prevent concentration in one spot.

The present invention is not to be limited by the illustrative embodiments serving as practical examples of the present invention, for obviously changes may be made within the scope of the following claims.

I claim:
1. A sensitive inertial instrument having a floating mass supported on a film of escaping fluid introduced from an external fluid pressure source, said instrument comprising:
  (a) a closed housing having a bore therewithin and having walls at least some of which include ducts extending therethrough and communicating with said bore;
  (b) an inertia-sensitive mass in the bore of diameter sufficient to leave an annular clearance space to provide a sliding fit therewithin;
  (c) said ducts including bearing ducts located in the walls of the housing for introducing fluid pressure into said clearance space, and further including exhaust ducts extending radially through the walls of the housing near the ends of the bore and so located with respect to the ends of the mass when centered in the bore that annular edges of the mass partially overlie and restrict the exhaust ducts, whereby displacement of the mass off-center in either direction will reduce the exhaust duct flow on the displacement side of the mass and increase the exhaust-duct flow on the other side; and
  (d) said housing having other exhaust ducts disposed axially of the bore, and said mass having throttling members attached to its opposite ends and located in axial alignment with the latter exhausts ducts in the housing so that when the mass is displaced toward an exhaust duct the adjacent member throttles said duct and reduces flow therethrough in proportion to displacement theretoward.

2. In an instrument as set forth in claim 1, by-pass means mutually connecting said axial exhaust ducts at opposite ends of the bore; and restricting means in the by-pass means for choking the flow of fluid therethrough.

3. A sensitive inertial instrument having a floating mass supported on a film of escaping fluid introduced from an external fluid pressure source, said instrument comprising:
  (a) a closed housing having a bore therewithin and having walls at least some of which include ducts extending therethrough and communicating with said bore;
  (b) an inertia-sensitive mass in the bore of diameter sufficient to leave an annular clearance space to provide a sliding fit therewithin;
  (c) said ducts including bearing ducts located in the walls of the housing for introducing fluid pressure into said clearance space, and further including exhaust ducts through the walls and so located with respect to the ends of the mass when centered in the bore that displacement of the mass off-center in either direction will reduce the exhaust duct flow on the displacement side of the mass and increase the exhaust-duct flow on the other side; and
  (d) said mass comprising a cylindrical spool having fluid bearing areas opposite said bearing ducts, and having turbine-effect slots in its bearing areas skewed out of alignment with its axis to cause the spool to rotate in the bore as the fluid escapes through the clearance spaces.

4. A sensitive inertial instrument having a floating mass supported on a film of escaping fluid introduced from an external fluid pressure source, said instrument comprising:
 (a) a closed housing having a bore therewithin of axial length greater than its diameter, and having walls at least some of which include ducts extending therethrough and communicating with said bore;
 (b) an inertia-sensitive mass comprising a spool in the bore shorter in length than the bore and of diameter sufficient to leave an annular clearance space to provide a sliding fit therewithin;
 (c) said ducts including bearing ducts located in the walls of the housing offset on each side of its center for introducing fluid pressure into said clearance space, and further including exhaust ducts extending radially through the walls at locations further from the center than said bearing ducts and so located with respect to the ends of the spool when centered in the bore that annular edges of the spool partially overlie and restrict the exhaust ducts, whereby displacement of the spool off-center in either direction will reduce the exhaust duct flow on the displacement side of the spool and increase the exhaust-duct flow on the other side; and
 (d) said housing having other exhaust ducts disposed axially of the bore, and said spool having throttling members attached to its opposite ends and located in axial alignment with the latter exhaust ducts in the housing so that when the spool is displaced toward an exhaust duct the adjacent member throttles said duct and reduces flow therethrough in proportion to displacement theretoward.

5. In an instrument as set forth in claim 4, by-pass means mutually connecting said axial exhaust ducts at opposite ends of the bore; and restricting means in the by-pass means for choking the flow of fluid therethrough.

6. A sensitive inertial instrument having a floating mass supported on a film of escaping fluid introduced from an external fluid pressure source, said instrument comprising:
 (a) a closed housing having a bore therewithin of axial length greater than its diameter, and having walls at least some of which include ducts extending therethrough and communicating with said bore;
 (b) an inertia-sensitive mass comprising a spool in the bore shorter in length than the bore and of diameter sufficient to leave an annular clearance space to provide a sliding fit therewithin;
 (c) said ducts including bearing ducts located in the walls of the housing offset on each side of its center for introducing fluid pressure into said clearance space, and further including exhaust ducts extending radially through the walls at locations further from the center than said bearing ducts and so located with respect to the ends of the spool when centered in the bore that annular edges of the spool partially overlie and restrict the exhaust ducts, whereby displacement of the spool off-center in either direction will reduce the exhaust duct flow on the displacement side of the spool and increase the exhaust duct flow on the other side; and
 (d) said spool having fluid-bearing areas opposite said bearing ducts and having radially disposed end surfaces, and the spool having an annular groove around it near each end separating said bearing areas from end ribs adjacent said end surfaces, and said exhaust ducts lying opposite these grooves when the spool is centered, and the body having end ducts opposite said end surfaces, the clearance between said end ribs and the bore determining the proportion of the fluid from the bearing areas that escapes respectively from the exhaust ducts and from the end ducts for a given position of the spool in the bore.

7. A sensitive inertial instrument having a floating mass supported on a film of escaping fluid introduced from an external fluid pressure source, said instrument comprising:
 (a) a closed housing having a bore therewithin of axial length greater than its diameter, and having side and end walls at least some of which include ducts extending therethrough and communicating with said bore;
 (b) an inertia-sensitive mass comprising a spool in the bore shorter in length than the bore to leave an empty end zone in the bore on each side of the spool, and of diameter sufficient to provide bearing surfaces which are a sliding fit therewithin with annular clearance space amounting to a few thousandths of an inch; and
 (c) said ducts including bearing ducts symmetrically located in the side walls of the housing on each side of its center and opposite bearing areas of the spool for introducing fluid pressure into said clearance space, and further including exhaust ducts through the walls near the end zones at locations further from the center than said bearing ducts and each partly covered by shoulders near the ends of the spool when centered in the bore so that displacement of the spool off-center in either direction will reduce the exhaust duct flow in the smaller end zone and increase the exhaust duct flow in the larger end zone.

8. In an instrument as set forth in claim 7, said spool having throttling members attached thereto opposite exhaust ducts in the housing so that when the spool is displaced toward an exhaust duct the adjacent member throttles said duct and reduces flow therethrough in proportion to displacement theretoward.

9. In an instrument as set forth in claim 7, by-pass means mutually connecting exhaust ducts on opposite sides of center of the bore; and restricting means in the by-pass means for choking the flow of fluid therethrough.

10. In an instrument as set forth in claim 7, said spool having fluid-bearing areas opposite said bearing ducts and having radially disposed end surfaces, and the spool having an annular groove around it near each end separating said bearing areas from end ribs adjacent said end surfaces, and said exhaust ducts lying opposite these grooves when the spool is centered, and the body having end ducts opposite said end surfaces, the clearance between said end ribs and the bore determining the proportion of the fluid from the bearing areas that escapes respectively from the exhaust ducts and from the end ducts for a given position of the spool in the bore.

11. A floating-mass accelerometer to be coupled to a source of fluid pressure and to selectively deliver fluid output from one of two ducts when acceleration forces deflect the mass in one or the other direction, comprising
 (a) a closed housing having a bore therewithin and the walls of the bore having ducts extending therethrough and communicating with said bore;
 (b) an inertia-sensitive mass comprising a spool in the bore and of diameter sufficient to provide a sliding fit therewithin with close annular clearance spaces therebetween, the spool having at least one annular groove therearound in a radial plane;
 (c) said ducts including bearing ducts located in the side walls and spaced from the ends of the bore to place them always opposite the spool for introducing fluid pressure into said clearance spaces, and further including exhaust ducts through the walls positioned near the ends of the spool when centered so that the exhaust ducts are throttled by the spool at one end and further opened at the other end when the spool is moved off-center toward said one end; and
 (d) valve means including a pressure inlet duct through the side wall communicating with said one groove in the spool, and selective output ducts through the side wall on either side of said inlet duct, one of said output ducts being connected by the spool to said inlet duct through said one groove each time the spool is moved off-center.

12. In an accelerometer as set forth in claim 11, the spool having a groove on each side of said one groove, and the housing having vent ducts adjacent to said output ducts and registering with said side grooves when the spool is centered, and one vent duct being connected by a side groove to an output duct each time the other output duct is connected to said inlet duct.

13. A floating-mass accelerometer to be coupled to dual-pressure source means and to selectively deliver fluid output from one of two ducts when acceleration forces deflect the mass in one or the other direction, comprising
  (a) a closed housing having a bore therewithin and the walls of the bore having ducts extending therethrough and communicating with said bore;
  (b) an inertia-sensitive mass comprising a spool in the bore, shorter in length than the bore and of diameter sufficient to provide a sliding fit therebetween with close annular clearance spaces therebetween, the spool having annular grooves in radial planes which are mutually spaced;
  (c) said ducts including bearing ducts located in the side walls and spaced from the center of the bore and located opposite the spool regardless of its axial position for introducing fluid at one pressure from said source means into said clearance spaces, and further including exhaust ducts through the walls positioned substantially opposite the ends of the spool when centered so that the exhaust ducts are throttled by the spool at one end and further opened at the other end when the spool is moved off-center toward said one end; and
  (d) valve means including a pressure inlet duct through the side wall connected for receiving fluid from said source means at a lower pressure and communicating with one groove in the spool, and selective output ducts through the side wall on either side of said inlet duct, one of said output ducts being connected by the spool to said inlet duct through said one groove each time the spool is moved off-center.

14. In accelerometer as set forth in claim 13, the spool having a groove on each side of said one groove, and the housing having vent ducts adjacent to said output ducts and registering with said side grooves when the spool is centered, and one vent duct being connected by a side groove to an output duct each time the other output duct is connected to said inlet duct.

References Cited by the Examiner

UNITED STATES PATENTS

| | | |
|---|---|---|
| 2,183,002 | 12/1939 | Bach _____ 73—515 |
| 2,892,660 | 6/1959 | Reswick et al. |
| 2,958,137 | 11/1960 | Mueller. |
| 3,063,041 | 11/1962 | Quade et al. |
| 3,080,761 | 3/1963 | Speen _____ 73—516 |
| 3,190,127 | 6/1965 | Gwathmey _____ 73—515 |

RICHARD C. QUEISSER, *Primary Examiner.*

J. J. GILL, *Assistant Examiner.*